(12) United States Patent
Wobben

(10) Patent No.: US 7,812,471 B2
(45) Date of Patent: Oct. 12, 2010

(54) METHOD OF OPERATING A WIND POWER STATION

(76) Inventor: Aloys Wobben, Argestrasse 19, Aurich (DE) 26607

( * ) Notice: Subject to any disclaimer, the term of this patent is extended or adjusted under 35 U.S.C. 154(b) by 0 days.

(21) Appl. No.: 12/535,562

(22) Filed: Aug. 4, 2009

(65) Prior Publication Data
US 2009/0289454 A1    Nov. 26, 2009

Related U.S. Application Data

(63) Continuation of application No. 10/553,429, filed as application No. PCT/EP2004/003394 on Mar. 31, 2004, now Pat. No. 7,619,321.

(51) Int. Cl.
*F03D 9/00* (2006.01)
*H02P 9/04* (2006.01)

(52) U.S. Cl. .......................... 290/44; 290/55

(58) Field of Classification Search .................. 290/43, 290/44, 54, 55; 415/7, 4.5, 4.2; 60/398, 60/698; 416/132 B, 1
See application file for complete search history.

(56) References Cited

U.S. PATENT DOCUMENTS

| | | | |
|---|---|---|---|
| 4,113,408 A | 9/1978 | Wurtz et al. | |
| 4,651,017 A * | 3/1987 | Longrigg | 290/44 |
| 6,201,313 B1 | 3/2001 | Nakamats | |
| 6,320,272 B1 | 11/2001 | Lading et al. | |
| 6,479,907 B1 | 11/2002 | Eriksson et al. | |
| 6,661,111 B1 * | 12/2003 | Wobben | 290/43 |
| 6,946,751 B2 | 9/2005 | Yoshida et al. | |
| 7,245,039 B2 | 7/2007 | DuHamel | |
| 7,281,891 B2 | 10/2007 | Smith et al. | |
| 7,309,930 B2 | 12/2007 | Suryanarayanan et al. | |
| 7,342,323 B2 | 3/2008 | Avagliano et al. | |
| 7,347,667 B2 | 3/2008 | Wobben | |
| 2007/0182162 A1 | 8/2007 | McClintic | |
| 2009/0250939 A1 | 10/2009 | Curme | |
| 2010/0054935 A1 | 3/2010 | Olesen | |
| 2010/0076614 A1 | 3/2010 | Nies et al. | |

FOREIGN PATENT DOCUMENTS

DE        19928048 A1  *  12/1999

OTHER PUBLICATIONS

Brinkmann, DE 19928084, Machine Translation of specification and claims, 1999, 9 pgs.
Verkuijlen, E. et al., "Shadow Hindrance by Wind Turbines," European Wind Energy Conference, Oct. 22-26, 1984, XP000921398, pp. 356-361.

* cited by examiner

*Primary Examiner*—Julio Gonzalez
(74) *Attorney, Agent, or Firm*—Seed Intellectual Property Law Group PLLC

(57) ABSTRACT

When planning and setting up wind power installations, the visual detractions to be expected due to the wind power installation on the environment play an increasingly important part in approval and acceptance. The shadow casting caused by the wind power installation on the adjoining properties is often perceived by the residents as being very troublesome. A wind power installation is provided to improve regulation of shadow casting. That is achieved by a method of operating a wind power installation by detecting a first light intensity in a region of direct light irradiation and detecting a second light intensity in a shadowed region. The wind power installation is shut down if the difference between the first light intensity and the second light intensity is greater than a predetermined value.

8 Claims, 4 Drawing Sheets

METHOD OF OPERATING A WIND POWER STATION

CROSS-REFERENCES TO RELATED APPLICATIONS

This application is a continuation of U.S. patent application Ser. No. 10/553,429, filed Aug. 7, 2006, now pending, which is a 371 of PCT/EP2004/003394, filed Mar. 31, 2004, which claims priority to DE 10318695.6, filed Apr. 24, 2003. These three applications are incorporated herein by reference in their entireties.

TECHNICAL FIELD

The present disclosure generally relates to wind power installations and methods for operating wind power installations.

BACKGROUND INFORMATION

When planning and setting up wind power installations, the visual detractions to be expected on the part of the wind power installation on the environment play an increasingly important part in approval and acceptance. If for example a wind power installation is placed in the proximity of a residence, it is possible, when the sun is in unfavorable positions, that the wind power installation or the rotor thereof is between the sun and the residence. If the sunshine is not affected by cloud, the rotating rotor constantly throws a (strobing) shadow on to the property. The shadow casting caused by the wind power installation on the adjoining properties is often perceived by the residents as being very troublesome. Even if the wind power installation satisfies the legal approval requirements there is however not always any guarantee that the undesired shadow casting effect is prevented.

DE 199 29 970 A1 discloses a shadow casting regulating system in which the intensity of light is detected in order to derive therefrom whether a shadow can occur at all.

It will be noted however that an adequate level of light intensity is only one of the prerequisites for a shadow to occur. A further prerequisite is for example clear air. Under hazy visual conditions, the light is diffused so that only slight or no shadowing occurs, in spite of the high level of light intensity. Control of a wind power installation, which is based on the intensity of the light, can result in a shutdown although there is no shadow.

BRIEF SUMMARY OF THE INVENTION

The object of the present invention is to provide a wind power installation, by means of which that disadvantage is overcome.

According to the invention that object is attained by a method of operating a wind power installation as set forth in herein. Advantageous developments are described herein.

The invention is based on the realization that shadow casting can occur only at a given position of the sun and with given light conditions or cloud cover if there is direct solar irradiation with a high level of light intensity. As however the cloud cover cannot be detected directly, but nonetheless can result in diffuse light in which no significant shadow occurs, a difference in brightness between light and shadow, which can be easily detected, is used. If the difference stays below a predetermined value, accordingly no clearly perceptible shadow occurs and therefore there is no need for the wind power installation to be shut down.

On the other hand, a disturbing shadow can occur even with a comparatively low level of light intensity. That can again be easily ascertained by detecting the difference in brightness between light and shadow.

As is known, the position of the sun is dependent on the time of the year and the time of day and can be ascertained by means of measurement or calculation programs for any relevant immission point (that is the location [region] at which shadow casting can occur). The basis for shadow-based shutdown of a wind power installation is accordingly the calculated times in which shadow casting can occur in respect of a neighboring resident (at the immission point) because of the position of the sun and the geographical arrangement of the installation. In parallel with the predetermined times in respect of the position of the sun, the difference between light and shadow is ascertained by way of light sensors and thus the plausibility of shadow casting occurring is checked. It is only if a shadow occurs during the predetermined times in respect of the position of the sun, at which a shadow can be cast at the immission point, that shadow-based shutdown of the wind power installation occurs.

In the case of the wind power installation according to the invention, shadow-based shutdown can be implemented by way of an input/display device (LC display). For that purpose the settings or values of the current levels of light intensity and the shutdown difference between light and shadow can be read off. In addition, it is possible to see from the display the status that the shutdown has at the current time, that is to say whether it is switched on or off or is active or inactive. Input of the shutdown times can be predetermined or loaded, in a separate menu.

In the mode 'shadow-based shutdown', the parameters current first light intensity (with direct light incidence) (value in %), current second light intensity (in a shadowed region) (value in %), shutdown difference (value in %), shadow shutdown (on/off) or shadow shutdown (active/inactive) are displayed. In that respect the shutdown difference is a value of the difference between the first light intensity (direct light irradiation) and the second light intensity (shadowed) at which the wind power installation is to be shut down. If for example a wind power installation is very close to an immission point, the shadow which is cast can be disturbing even when the sky is slightly overcast. Therefore in that case (the wind power installation is very close to the immission point in question), the installation should receive a lower value for the shutdown difference, than for the situation where the immission point is further away from the wind power installation. In regard to the levels of light intensity, a low percentage value signifies a low level of light intensity (for example when the sky is overcast) and a high percentage value signifies a strong light intensity, for example direct sun irradiation, which indicates that the solar irradiation is not disturbed by cloud cover or mist. Shadow shutdown (on/off) indicates whether that is at all activated. Shadow shutdown (active/inactive) specifies whether the installation is shutdown at present because of a shadow being cast.

If, for the difference, a value above the shutdown difference is ascertained and if at the same time there is coincidence in the inputted time window, which takes account of the solar irradiation or the position of the sun, the wind power installation stops automatically if shadow-based shutdown is switched to 'on'. While the installation is stopped because of a shadow being cast, a corresponding status message appears in the main menu of the display device.

The value of the shutdown difference can be altered by way of suitable inputs. As the shadow of the rotor blades becomes weaker with increasing distance in relation to the immission point and at some point loses significance entirely, the cast shadow still has an unfavorable effect with increasing distance only when a greater difference is involved. The shutdown difference must be set in accordance with local factors because the shutdown difference also depends on the geographical factors on the spot.

The light conditions are also continually further measured after the installation stops. The wind power installation automatically starts again if the shutdown difference falls below its specified value for a duration of more than 2 minutes, preferably 10 minutes, or the shadow has moved (by virtue of a change in the position of the sun or because of the sun's path), to such an extent that there are no longer any adverse effects due to shadow casting at the immission point.

The times for the occurrence of shadow casting are edited for input by way of a menu. In that respect the values are composed of a beginning and an end date and a start and a stop time. Inputted values can be altered, expanded or erased at any time, which can be effected by means of manual input or by reading in a suitable program.

The times in respect of the position of the sun are inputted in the format of Winter time. Leap years are also taken into account in the programming.

The times for shadow-based shutdown can always be called up at the current time or afterwards by way of remote monitoring so that it is possible to provide proof in regard to compliance.

A wind power installation for carrying out the foregoing method includes a data processing apparatus in which the positions of the sun or data representing same are stored. The wind power installation further includes a plurality of and preferably three light sensors. Those sensors are arranged in uniformly spaced relationship around the installation.

With three sensors, there is thus a spacing of 120° between the respective sensors if they are arranged on a notional circle around the wind power installation. When using three sensors, one is always subjected to direct light incidence and at least one further sensor is arranged in a shadowed region. It is therefore always possible to ascertain the difference in light intensity.

BRIEF DESCRIPTION OF THE SEVERAL VIEWS OF THE DRAWINGS

The invention is described in greater detail hereinafter by means of an embodiment by way of example.

DETAILED DESCRIPTION

Figure 1:
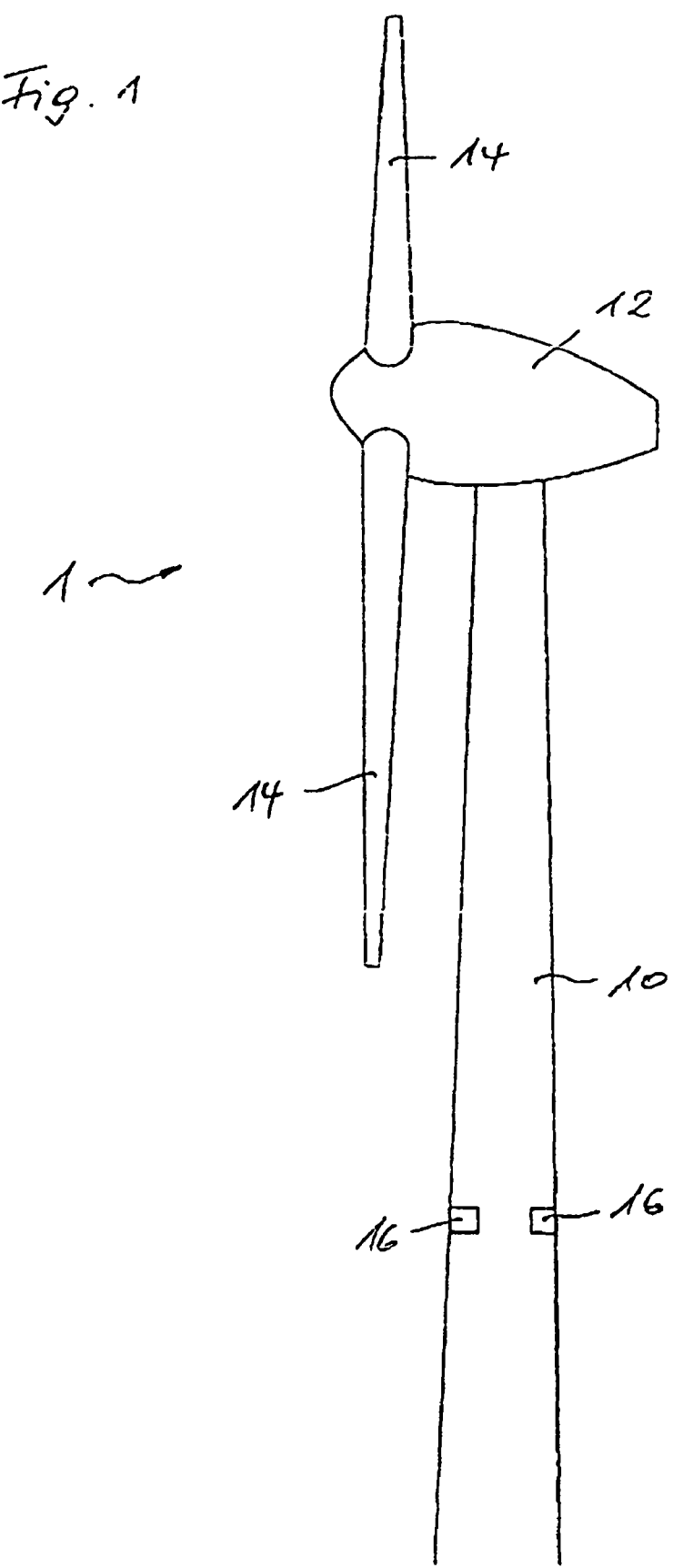
FIG. 1 shows a side view of a wind power installation according to the invention.

FIG. 1 shows a simplified side view of a wind power installation 1.

That wind power installation 1 includes a pylon 10, at the head of which is arranged a pod 12 with rotor blades 14. Arranged at a predetermined height on the pylon 10 are sensors 16 which detect the light intensity. Arranging the sensors 16 at a predetermined height substantially prevents them from being the subject of malicious damage or manipulation.

In that respect the height can be so selected that the sensors 16 can be reached at reasonable cost in order for example to be able to clean them or also replace them. It will be appreciated that it is also possible to provide heating for the sensors 16 in order to prevent or eliminate icing thereof.

As an alternative to mounting the sensors 16 on the pylon 10 of the wind power installation 1, it will be appreciated that the sensors 16 can also be mounted on separate masts (not shown) or other suitable devices.

Figure 2:
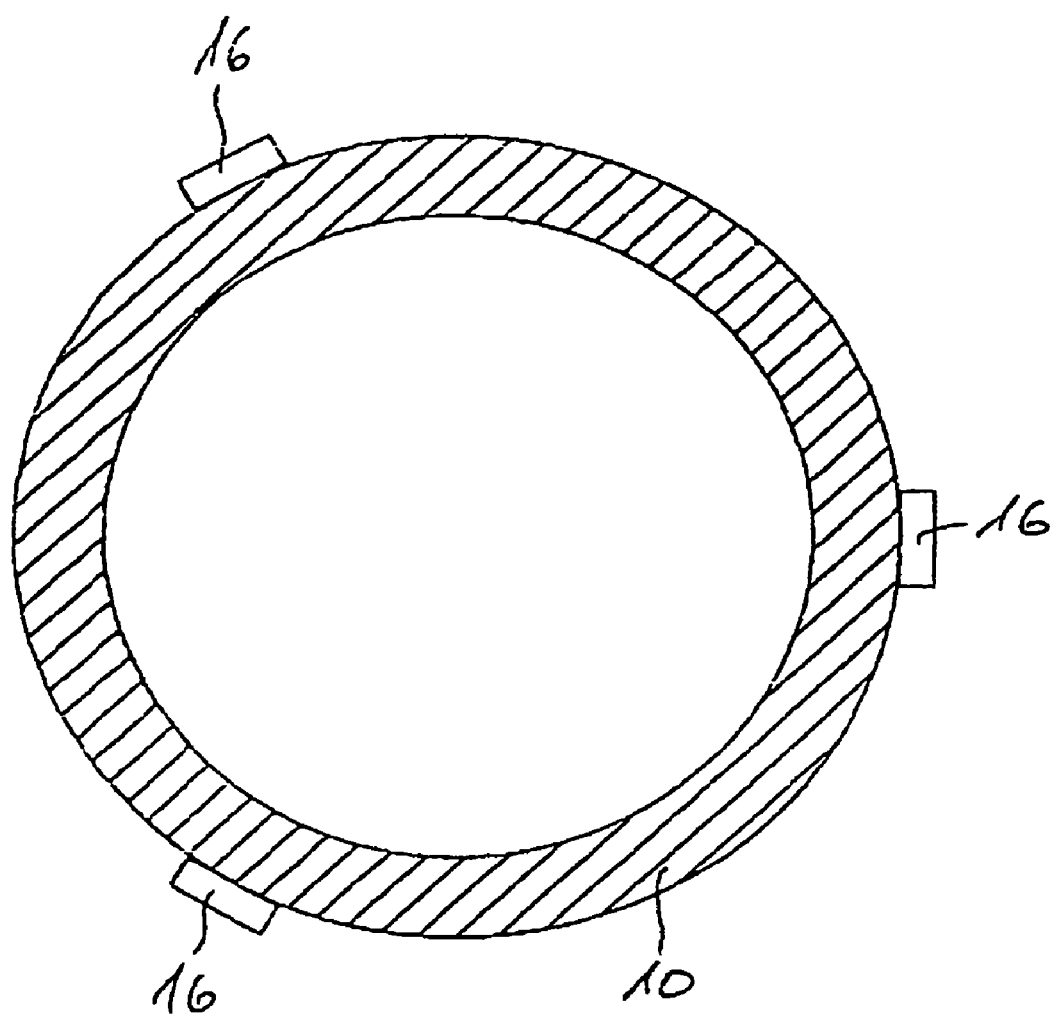
FIG. 2 shows a simplified plan view on to a cross-section through the pylon above the light sensors.

FIG. 2 is a simplified view in cross-section through the pylon 10 of the wind power installation 1 above the sensors 16. It can be seen from this FIG. 2 that in this case three sensors 16 are preferably disposed at uniform spacings at the outer periphery of the pylon 10. The spacing between the sensors is therefore 120°.

By virtue of the round cross-section of the pylon 10, one half of the peripheral surface of the pylon 10, that is to say a region of 180°, is always exposed to the direct incidence of light. Accordingly the other half of the peripheral surface (again 180°) will be in shadow. The use of at least three sensors therefore means that at least one is certain to be exposed to direct incidence of light and at least one is in shadow.

Accordingly, at any desired moment in time, the light intensity when direct light irradiation is involved and the light intensity in shadow can be detected, and the difference thereof can be ascertained. That difference can be determined by a control system 28 of FIG. 1 of the installation and used straightaway for control according to the invention of the wind power installation.

Figure 3:
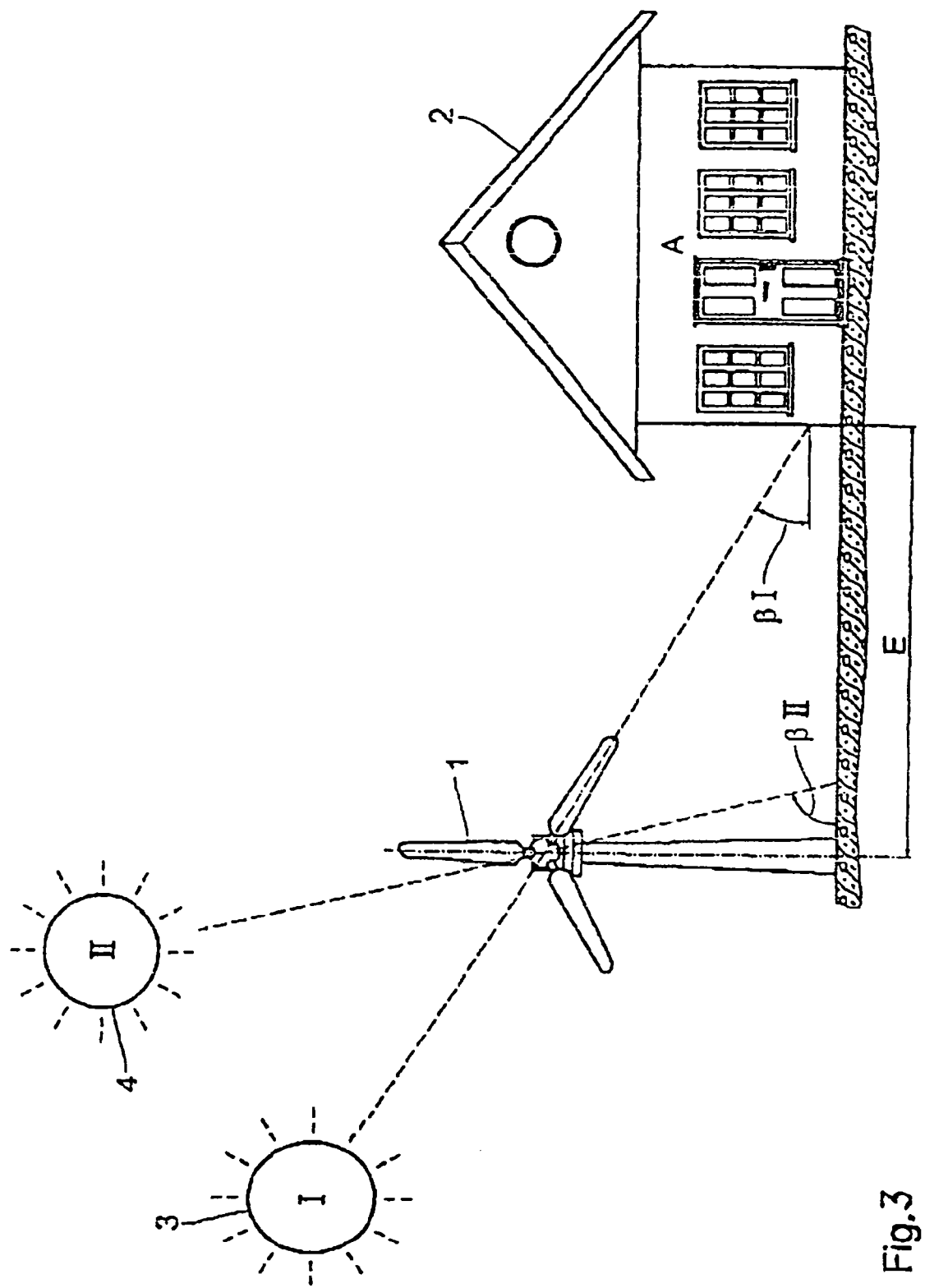
FIG. 3 shows a side view illustrating the shadow casting effect at two different positions of the sun.

FIG. 3 shows a wind power installation, for example of type E-40 from Enercon, which is at a given distance E from a house 2. That house 2 can also be referred to as the immission point A.

When the sun rises in the morning and also throughout the day in the Winter time, the sun only rises to a low height—always as viewed from the immission point A—so that when the sun is in position I the angle of incidence is βI.

If the sun rises higher—position II of the sun—that involves a different angle of incidence βII of the rays of the sun. Those angles of incidence βI and βII (it is possible to envisage any other angles of incidence) of the rays of the sun also establish when in general a shadow can be cast directly at the immission point A.

Figure 4:
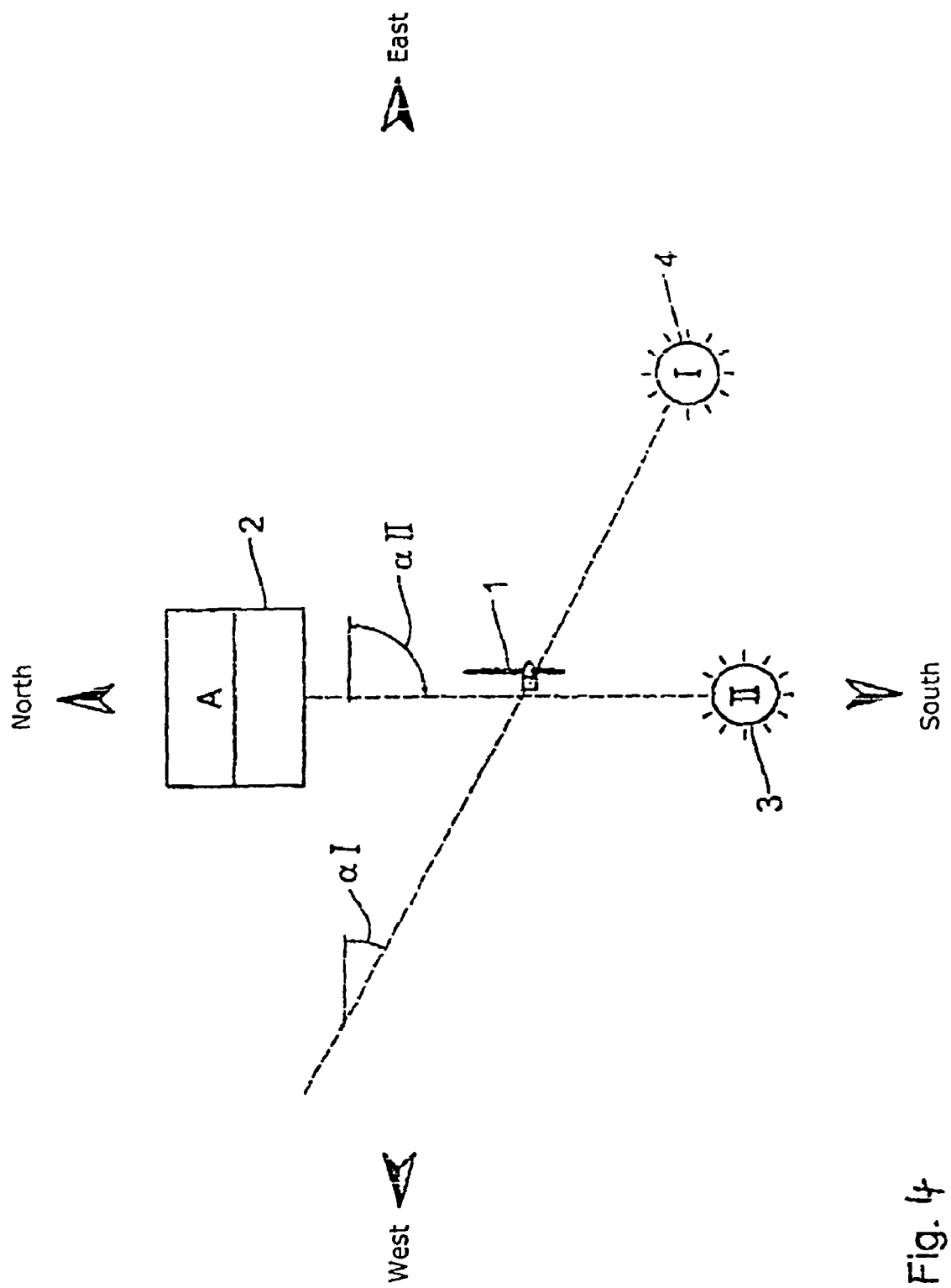
FIG. 4 shows a plan view of the shadow casting effect also at two different positions of the sun.

The scenario illustrated in FIG. 3 is shown once again in FIG. 4, from another perspective. When the sun is in the south east (once again considered from the immission point), the rays of the sun impinge on the wind power installation at an angle βI—in relation to the west-east axis—.

As soon as the sun has traveled further in the direction of south, the rays of the sun are incident on the wind power installation 1 at another angle βII.

It is only when the position of the sun which is a function of the geographical location on the Earth and the angles of incidence α and β provides that the shadow of the wind power installation is incident on the immission point A, that the wind power installation is shut down if the difference between light and shadow is above a predetermined value, namely the shutdown difference. The shutdown difference depends not only on the light incidence but also the distance in relation to the immission point. If a wind power installation is very close to the immission point in question, the cast shadow which occurs can be troublesome even with a slightly overcast sky. In such a situation therefore the wind power installation should acquire a lower value for the shutdown difference than for the situation where the immission point is further away from the wind power installation.

If the difference is below the shutdown difference, the wind power installation—irrespective of the position of the sun—is not shut down and can still generate electrical energy. Such a situation occurs in particular when the sky is heavily clouded.

The further away that a wind power installation is from the immission point, the correspondingly shorter are the times within which in general a shadow casting effect can occur at the immission point.

The difference can be measured directly at the immission point A or at the wind power installation. As the immission point and the wind power installation are relatively close together, the light intensity values measured at the wind power installation are also valid for the immission point A.

The difference itself can be measured for example with a plurality of light sensors whose values are processed by a data processing apparatus 30 of FIG. 1 associated with the wind power installation. The positions of the sun at which shadow casting can occur at the immission point are also programmed in that data processing apparatus 30. In some embodiments, shadow-based shutdown can be implemented by way of an input/display device 32 (illustrated in dashed line). It will be easily appreciated that those 'shadow-casting' positions of the sun are different for each wind power installation and therefore the data processing apparatus 30 has stored, for each wind power installation, a different position of the sun at which a shadow can be cast.

It will be appreciated that it is also possible that, in the case of a wind farm arranged in the proximity of an immission point, where a shadow casting effect is to be avoided, this can be controlled by a central data processing apparatus which switches off a respective individual wind power installation of a wind farm when that installation causes a shadow to be cast at the immission point.

If a shadow is cast, the wind power installation is not shut down immediately but only when the shadow has been cast over a certain period of time, for example between 5 and 10 minutes.

If a shadow is no longer being cast, for example because clouds have come between the sun and the wind power installation, it is also possible to provide that the system does not switch on the wind power installation again immediately, but waits for a certain time, for example between 5 and 10 minutes, and provides for switching on the wind power installation and for causing it to run again, only when the difference was below the shutdown difference within that period of time.

It is also possible to program further positions of the sun for the wind power installation if that is necessary, besides shutdown positions of the sun which have already been programmed.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ techniques and structures of the various patents, applications and publications to provide yet further embodiments.

These and other changes can be made to the embodiments in light of the above-detailed description. In general, in the following claims, the terms used should not be construed to limit the invention to the specific embodiments disclosed in the specification and the claims. Accordingly, the invention is not limited by the disclosure, but instead its scope is to be determined entirely by the following claims, which are to be construed in accordance with established doctrines of patent claim interpretation.

The invention claimed is:

1. A wind power system, comprising:
a plurality of spaced apart detectors that detect light intensity at different regions, the plurality of detectors includes a first detector to detect a first light intensity in a first region and a second detector to detect a second light intensity in a second region; and
a control system coupled to said first and second detectors and adapted to disable at least a portion of the wind power system if the second light intensity is lower than the first light intensity and a difference between the first light intensity and the second light intensity is greater than a value.

2. The wind power system of claim 1 wherein the first and second detectors comprise part of a plurality of substantially uniformly spaced detectors to detect light intensity at different regions.

3. The wind power system of claim 1 wherein the control system is adapted to disable the portion of the wind power system based on a comparison of a value associated with the detected first and second light intensities with stored values associated with a position of a sun.

4. The wind power system of claim 3 wherein the control system is adapted to use software to perform the comparison of the value associated with the detected first and second light intensities with stored values associated with the position of the sun.

5. The wind power system of claim 1, wherein the plurality of detectors are spaced about a circumference of a pylon of the wind power system.

6. The wind power system of claim 1, wherein the detectors are spaced apart from one another to always have at least one of the detectors in a shadow cast by the wind power system when the wind power system is in direct sunlight.

7. The wind power system of claim 1, wherein at least one of the detectors is positioned to receive direct sunlight from the sun when another one of the detectors is in a shadow of the wind power system.

8. The wind power system of claim 1, wherein the detectors surround a pylon such that at least one of the detectors is in a shadow cast by the pylon when another one of the detects is exposed to direct sunlight.

* * * * *

UNITED STATES PATENT AND TRADEMARK OFFICE
CERTIFICATE OF CORRECTION

| | | |
|---|---|---|
| PATENT NO. | : 7,812,471 B2 | Page 1 of 1 |
| APPLICATION NO. | : 12/535562 | |
| DATED | : October 12, 2010 | |
| INVENTOR(S) | : Aloys Wobben | |

It is certified that error appears in the above-identified patent and that said Letters Patent is hereby corrected as shown below:

Title page, Item 30
Foreign Application Priority Data should read, --Apr. 24, 2003 (DE) 103 18 695.6--.

Signed and Sealed this
Twenty-fifth Day of January, 2011

David J. Kappos
*Director of the United States Patent and Trademark Office*